(12) United States Patent
Lin et al.

(10) Patent No.: US 11,280,950 B2
(45) Date of Patent: Mar. 22, 2022

(54) BACKLIGHT MODULE

(71) Applicant: Coretronic Corporation, Hsin-Chu (TW)

(72) Inventors: Yi-Cheng Lin, Hsin-Chu (TW);
Cheng-Tsung Li, Hsin-Chu (TW);
Tsung-Wen Chiu, Hsin-Chu (TW);
Tzeng-Ke Shiau, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 17/115,270

(22) Filed: Dec. 8, 2020

(65) Prior Publication Data

US 2021/0181400 A1    Jun. 17, 2021

(30) Foreign Application Priority Data

Dec. 16, 2019   (CN) .......................... 201922249644.5

(51) Int. Cl.
*F21V 8/00*        (2006.01)
(52) U.S. Cl.
CPC ........... *G02B 6/0023* (2013.01); *G02B 6/005* (2013.01)
(58) Field of Classification Search
None
See application file for complete search history.

(56) References Cited

U.S. PATENT DOCUMENTS

| | | | |
|---|---|---|---|
| 8,503,062 B2* | 8/2013 | Baur ................. | B32B 17/10174 359/267 |
| 2016/0212294 A1* | 7/2016 | Ohzawa ............... | G02B 6/0001 |
| 2018/0356581 A1* | 12/2018 | Chen ...................... | G02B 6/005 |
| 2019/0187355 A1* | 6/2019 | An ......................... | G02B 5/003 |
| 2019/0285793 A1* | 9/2019 | Jeon ...................... | G02B 6/0088 |
| 2019/0324305 A1* | 10/2019 | Numata ............ | G02F 1/133512 |
| 2020/0292882 A1* | 9/2020 | Nakamura ........ | G02F 1/136286 |
| 2020/0319395 A1* | 10/2020 | Wang ........................ | F21S 8/00 |

FOREIGN PATENT DOCUMENTS

CN           109752881 A          5/2019

* cited by examiner

*Primary Examiner* — Fatima N Farokhrooz
(74) *Attorney, Agent, or Firm* — Muncy, Geissler, Olds & Lowe, PC

(57) ABSTRACT

A backlight module includes a light guide plate, a light source and a surface deposition layer. The light guide plate has a light incident surface, an opposite surface opposite the light incident surface, and a light exit surface connected between the light incident surface and the opposite surface. The light source is disposed adjacent to the light incident surface, and a surface deposition layer is at least provided on a part of the opposite surface and a part of the light exit surface. The surface deposition layer includes an opaque material or a low light-transmittance material and has a thickness of smaller than 0.1 mm.

10 Claims, 5 Drawing Sheets

BACKLIGHT MODULE

CROSS-REFERENCE TO RELATED APPLICATION

This application claims the priority benefit of China application serial no. 201922249644.5, filed Dec. 16, 2019. The entirety of the above-mentioned patent application is hereby incorporated by reference herein and made a part of this specification.

BACKGROUND

Field of the Invention

The invention relates to a backlight module, and more particularly to a backlight module having a light-blocking layer.

Description of the Related Art

FIG. 1 is a schematic cross-sectional view of a conventional backlight module. As shown in FIG. 1, a polyester thin film (Mylar) 106 is attached between the light guide plate 102 and the back plate 104 in a backlight module 100 to reduce peripheral leakage of stray light and thus provide a comfortable visual feeling for the periphery of viewing areas. However, for a commonly-used narrow-border display, its frame width may be too narrow to accommodate a light-blocking film. Therefore, in case a light-blocking film is used in a narrow-border display, a comfortable visual feeling for the periphery of viewing areas is hardly obtained because a sufficient bonding area/width for the light-blocking film cannot be provided.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by a person of ordinary skill in the art.

BRIEF SUMMARY OF THE INVENTION

The invention provides a backlight module having a light-blocking layer.

Other objects and advantages of the invention may be further illustrated by the technical features broadly embodied and described as follows.

In order to achieve one or a portion of or all of the objects or other objects, one embodiment of the invention provides a backlight module including a light guide plate, a first light-blocking layer and a light source. The light guide plate has a light incident side and an opposite side opposite the light incident side, the light incident side is provided with a light incident surface, and the opposite side is provided with an opposite surface. The light guide plate has a light exit surface and a bottom surface opposite the light exit surface, and each of the light exit surface and the bottom surface is connected between the light incident surface and the opposite surface. The first light-blocking layer is disposed on the opposite side and includes a first part and a second part. The first part is formed on the light exit surface at a position adjacent to the opposite surface, the second part is formed on the bottom surface at a position adjacent to the opposite surface, and a length of the first part measured in a direction perpendicular to the light incident surface is greater than a length of the second part measured in the direction perpendicular to the light incident surface. The light source is located on the light incident side of the light guide plate.

Another embodiment of the invention provides a backlight module including a light guide plate, a light source and a surface deposition layer. The light guide plate has a light incident surface, an opposite surface opposite the light incident surface, and a light exit surface connected between the light incident surface and the opposite surface. The light source is disposed adjacent to the light incident surface, and a surface deposition layer is at least provided on a part of the opposite surface and a part of the light exit surface. The surface deposition layer includes an opaque material or a low light-transmittance material and has a thickness of smaller than 0.1 mm.

According to the above embodiments, the light-blocking layer is allowed to weaken the light intensity of side emission of the light guide plate and prevent stray light from entering viewing areas, thereby achieving a comfortable visual feeling. Further, because the opaque or low light-transmittance material is directly deposited on a surface of the light guide plate to form the light-blocking layer, the light-blocking layer can be, even confined to the narrow-border requirement, easily attached to end surfaces of the light guide plate and may provide sufficient light-blocking areas. Moreover, the light transmittance of deposition materials or relative percentages of dyes may vary to adjust the light-blocking degree of the entire light-blocking layer or specific regions of the light-blocking layer to further improve the luminous uniformity and visual feeling. Besides, the light-blocking part on a light exit surface and the light-blocking part on a bottom surface may have different lengths to allow the top side and the bottom side of a light guide plate to be more distinguishable from each other during assembly and hence reduce assembly errors.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
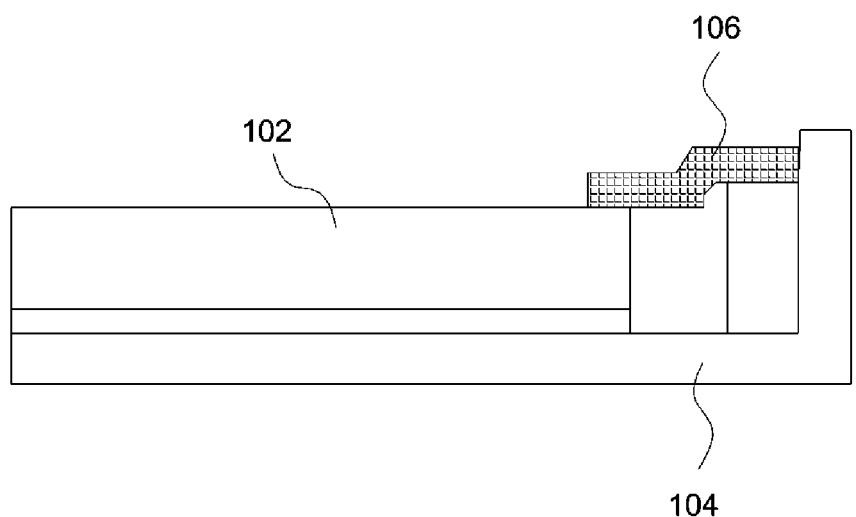
FIG. 1 is a schematic cross-sectional view of a conventional backlight module.
Figure 2:
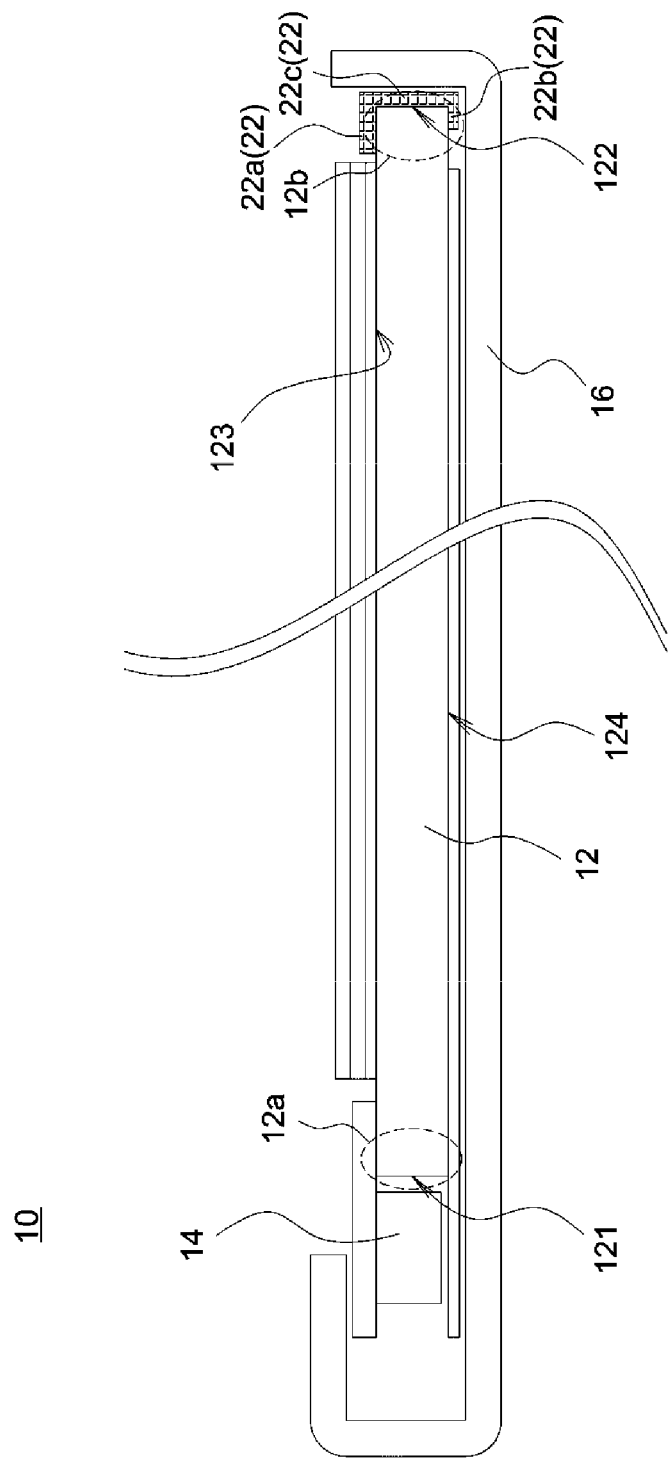
FIG. 2 is a schematic cross-sectional view of a backlight module according to an embodiment of the invention.

FIG. 2 is a schematic cross-sectional view of a backlight module according to an embodiment of the invention. Referring to FIG. 2, in this embodiment, a backlight module 10 includes a light guide plate (LGP) 12, a light source 14, a back plate 16 and a first light-blocking layer 22. The light guide plate 12 has a light incident side 12a and an opposite side 12b opposite the light incident side 12a. The light source 14 is located on the light incident side 12a of the light guide plate 12. The light incident side 12a is provided with a light incident surface 121, the opposite side 12b is provided with an opposite surface 122. The light guide plate 12 also has a light exit surface 123 and a bottom surface 124, and each of the light exit surface 123 and the bottom surface 124 is connected between the light incident surface 121 and the opposite surface 122. The light source 14 is disposed adjacent to the light incident surface 121. The first light-blocking layer 22 is disposed on the opposite side 12b and includes a first part 22a and a second part 22b, the first part 22a is formed on the light exit surface 123 at a position adjacent to the opposite surface 122, and the second part 22b is formed on the bottom surface 124 at a position adjacent to the opposite surface 122. Further, in this embodiment, the light-blocking layer 22 may further includes a third part 22c formed on the opposite surface 122, and two ends of the third part 22c are respectively connected with the first part 22a and the second part 22b, but the invention is not limited thereto.

In this embodiment, the first light-blocking layer 22 is formed on a surface of the light guide plate 12 by depositing an opaque material or a low light-transmittance material on a surface of the light guide plate 12 by means of, for example, coating, printing (such as ink printing), or dispensing, and hence the first light-blocking layer 22 may be a coating layer, a printed layer or a glue dispensing layer. The first light-blocking layer 22 may be made of colored dyes mixed with a resin, an optical adhesive or a solvent, but the invention is not limited thereto.

According to the above embodiment, the first light-blocking layer 22 may blacken the end side of the light guide plate 12 to a certain degree to weaken the light intensity of side emission of the light guide plate 12 and prevent stray light from entering viewing areas, thereby achieving a comfortable visual feeling. Further, because the opaque or low light-transmittance material is directly deposited on a surface of the light guide plate 12 to form the first light-blocking layer 22, the first light-blocking layer 22 can be, even confined to the narrow-border requirement, easily attached to end surfaces of a light guide plate 12 and may provide sufficient light-blocking areas. Compared with conventional designs using a polyester thin film (Mylar) or other light-shielding sheet to provide light-blocking effects, the above embodiments may reduce the bonding difficulties and provide sufficient bonding areas/width for a narrow-border display.

Moreover, the light transmittance of deposition materials or relative percentages of dyes may vary to adjust the light-blocking degree of the entire first light-blocking layer 22 or specific regions of the first light-blocking layer 22 to further improve the luminous uniformity and visual feeling. Besides, the first light-blocking layer 22 may have a reduced thickness because the material forming the first light-blocking layer 22 is directly deposited on surfaces. In one embodiment, the first light-blocking layer 22 formed by material deposition may have a thickness of smaller than 0.1 mm.

Figure 3:
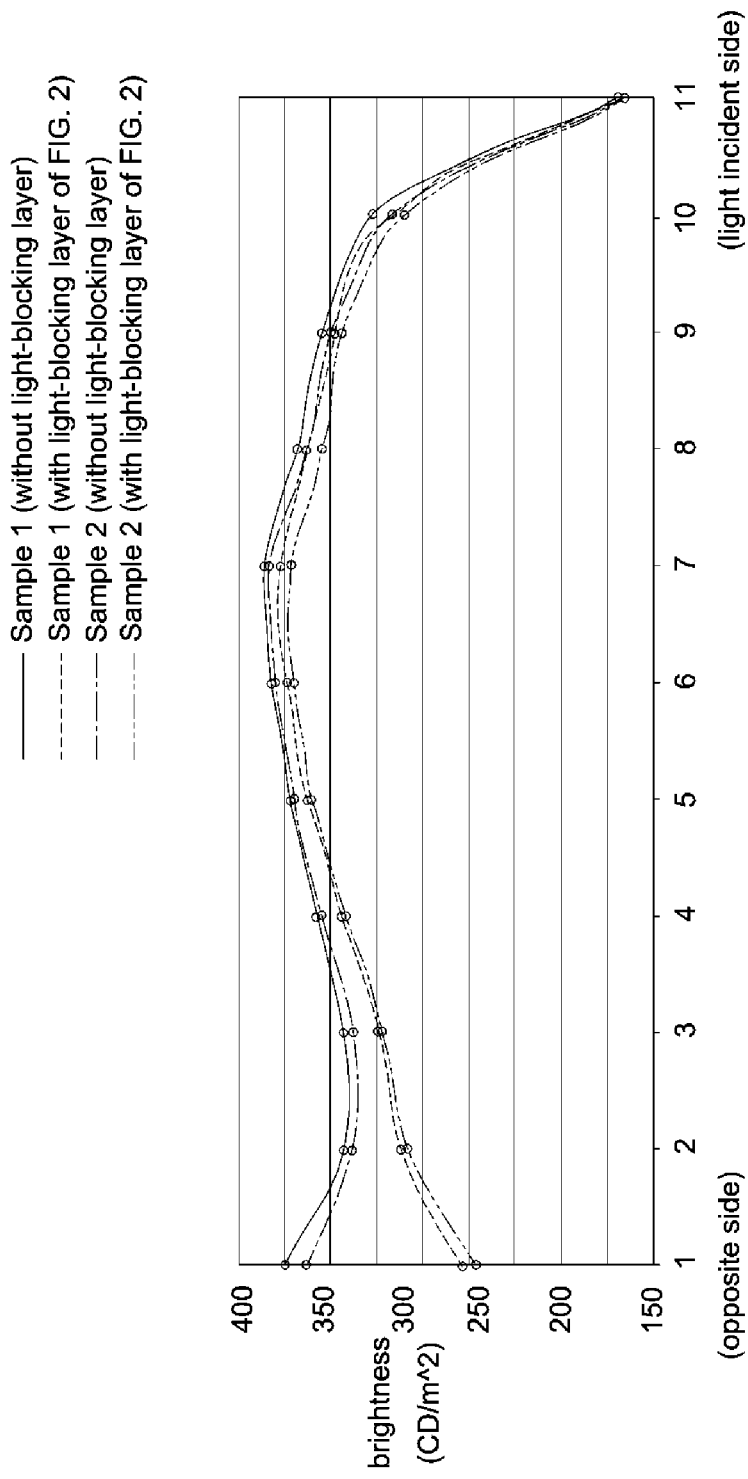
FIG. 3 shows a diagram comparing the brightness performance of a backlight module without a light-blocking layer and the brightness performance of a backlight module with a light-blocking layer shown in FIG. 2.

FIG. 3 shows a diagram comparing the brightness performance of a backlight module without a light-blocking layer and the brightness performance of a backlight module with a light-blocking layer shown in FIG. 2. As can be clearly seen in FIG. 3, providing a light-blocking layer shown in FIG. 2 may considerably decrease the brightness of a light guide plate at the opposite side, which indicates stray light emission of a light guide plate is effectively reduced to allow for an improved visual feeling.

Figure 4:
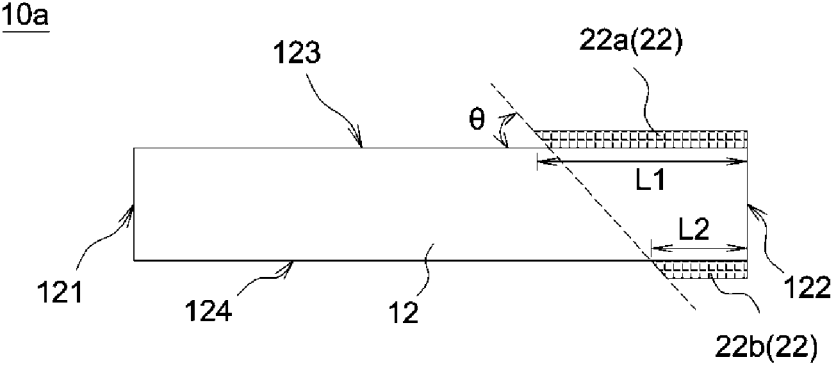
FIG. 4 is a schematic cross-sectional view of a backlight module according to another embodiment of the invention.

FIG. 4 is a schematic cross-sectional view of a backlight module according to another embodiment of the invention. Referring to FIG. 4, in a backlight module 10a, the first part 22a of the first light-blocking layer 22 has a first length L1 measured in a direction perpendicular to the light incident surface 121, the second part 22b of the first light-blocking layer 22 has a second length L2 measured in a direction perpendicular to the light incident surface 121, and the first length L1 is greater than the second length L2. By setting the first part 22a and the second part 22b with different lengths, the light exit surface 123 (provided with the first part 22a) and the bottom surface 124 (provided with the second part 22b) are, after light-blocking materials are coated or printed thereon, more distinguishable from each other to reduce assembly errors. Alternatively, in this embodiment, one end of the first part 22a closest to the light incident surface 121 (such as the left end shown in FIG. 4) is away from the opposite surface 122 by a first distance, one end of the second part 22b closest to the light incident surface 121 (such as the left end shown in FIG. 4) is away from the opposite surface 122 by a second distance, and the first distance is greater than the second distance. Setting the first and the second distances as different similarly allows the light exit surface 123 and the bottom surface 124 to be more distinguishable from each other to reduce assembly errors. Moreover, in one embodiment, the first light-blocking layer 22 is arranged to satisfy the condition: $L1=L2+(T\times\cot\theta)$, where L1 denotes a length of the first part 22a measured in a direction perpendicular to the light incident surface 121, L2 denotes a length of the second part 22b measured in a direction perpendicular to the light incident surface 121, T denotes a length of the opposite surface 122 measured in a direction perpendicular to the light exit surface 123, and θ denotes a panel inspection angle. In case the length L2 is greater than the value of $L1-(T\times\cot\theta)$, it means the first light-blocking layer 22 is visible to an inspector under the panel inspection angle θ; that is, the second part 22b of first light-blocking layer 22 on the bottom surface 124 may too long to reach viewing areas of a display. In comparison, in case the length L2 is smaller than the value of $L1-(T\times\cot\theta)$, it means the length of the second part 22b of the first light-blocking layer 22 may be too short to provide sufficient light-blocking effects. Therefore, once the condition of $L1=L2+(T\times\cot\theta)$ is met, the first light-blocking layer 22 is not visible to the inspector and allowed to provide sufficient light-blocking effects. Note the panel inspection angle θ may vary and is prescribed in an inspection specification of a display panel. For example, if the inspection specification defines the panel inspection angle θ as 45 degrees, the value of 45 degrees can be substituted into the above equation $L1=L2+(T\times\cot\theta)$ to determine the lengths of the first part 22a and the second part 22b of the first light-blocking layer 22.

Figure 5:
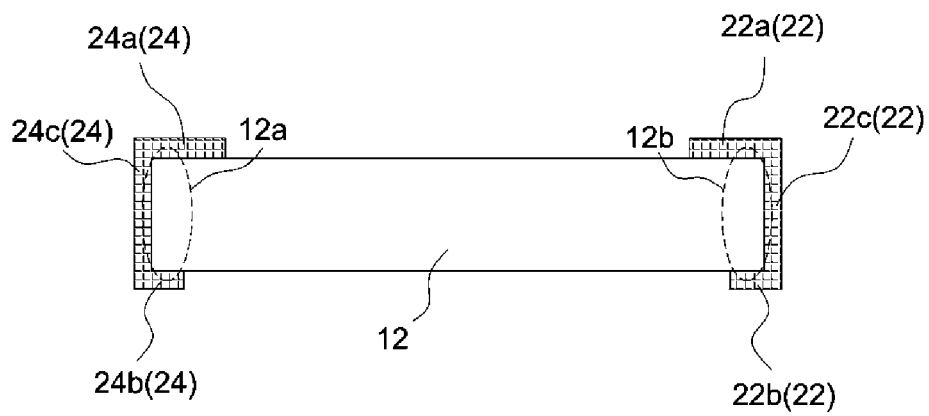
FIG. 5 is a schematic cross-sectional view of a backlight module according to another embodiment of the invention.

FIG. 5 is a schematic diagram of a backlight module according to another embodiment of the invention. As shown in FIG. 5, a backlight module 10b in this embodiment is different to the backlight module 10a of FIG. 4 in that a second light-blocking layer 24 is additionally provided on a light incident side 12a of the light guide plate 12 to reduce stray light emission at the light incident side 12a. The second light-blocking layer 24 may include at least one of a first part 24a, a second part 24b and a third part 24c. Moreover, the second light-blocking layer 24 may be arranged to satisfy the condition of $L1=L2+(T\times\cot\theta)$, so that the second light-blocking layer 24 is not visible to the inspector and may provide sufficient light-blocking effects. Similarly, the second light-blocking layer 24 may be a coating layer, a printed layer or a glue dispensing layer deposited on a surface of the light guide plate 12, and the second light-blocking layer 24 may have a thickness of smaller than 0.1 mm.

Figure 6:
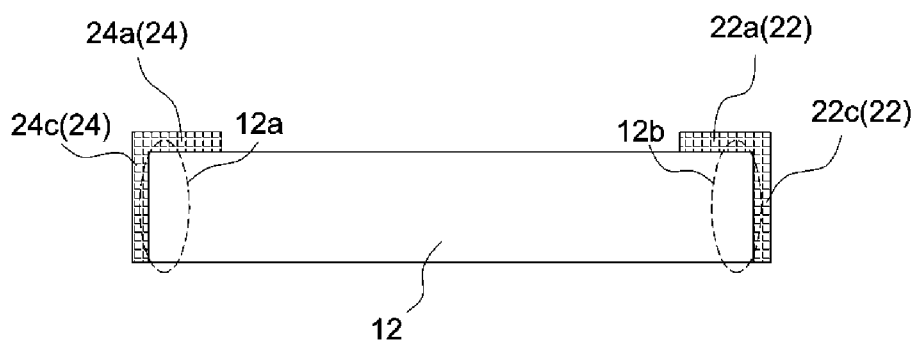
FIG. 6 is a schematic cross-sectional view of a backlight module according to another embodiment of the invention.
Figure 7:
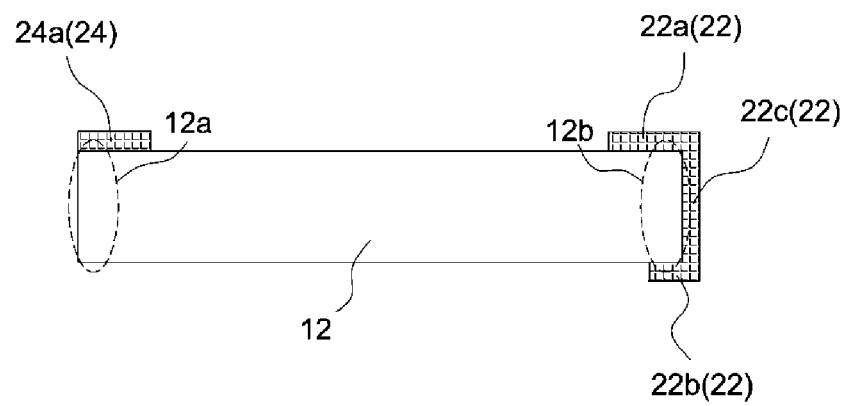
FIG. 7 is a schematic cross-sectional view of a backlight module according to another embodiment of the invention.

FIG. 6 and FIG. 7 illustrate different arrangements of light-blocking layers according to various embodiments of the invention. As shown in FIG. 4 to FIG. 7, the first light-blocking layer 22 and/or the second light-blocking layer 24 may be disposed on at least one of the light incident side 12a and the opposite side 12b of the light guide plate 12. Further, the first light-blocking layer 22 and/or the second light-blocking layer 24 may be disposed on at least one of the light incident surface 121, the opposite surface 122, the light exit surface 123 and the bottom surface 124 of the light guide plate 12. That is, the arrangement and area of a light-blocking layer are not restricted and may vary according to actual demands. As shown in FIG. 6, the backlight module 10c in this embodiment is different to the backlight module 10b of FIG. 5 in that each of the first light-blocking layer 22 and the second light-blocking layer 24 does not have the second part 22b or 24b. As shown in FIG. 7, the backlight module 10d in this embodiment is different to the backlight module 10b of FIG. 5 in that the second light-blocking layer 24 does not have the second part 24b and the third part 24c.

According to the above embodiments, the light-blocking layer is allowed to weaken the light intensity of side emission of the light guide plate and prevent stray light from entering viewing areas, thereby achieving a comfortable visual feeling. Further, because the opaque or low light-transmittance material is directly deposited on a surface of the light guide plate to form the light-blocking layer, the light-blocking layer can be, even confined to the narrow-border requirement, easily attached to end surfaces of the light guide plate and may provide sufficient light-blocking areas. Moreover, the light transmittance of deposition materials or relative percentages of dyes may vary to adjust the light-blocking degree of the entire light-blocking layer or specific regions of the light-blocking layer to further improve the luminous uniformity and visual feeling. Besides, the light-blocking part on a light exit surface and the light-blocking part on a bottom surface may have different lengths to allow the top side and the bottom side of a light guide plate to be more distinguishable from each other during assembly and hence reduce assembly errors.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A backlight module, comprising:
a light guide plate having a light incident side and an opposite side opposite the light incident side, the light incident side being provided with a light incident surface, the opposite side being provided with an opposite surface, and the light guide plate having a light exit surface and a bottom surface opposite the light exit surface, wherein each of the light exit surface and the bottom surface is connected between the light incident surface and the opposite surface;
a first light-blocking layer disposed on the opposite side and comprising a first part and a second part, the first part being formed on the light exit surface at a position adjacent to the opposite surface, the second part being formed on the bottom surface at a position adjacent to the opposite surface, and a length of the first part measured in a direction perpendicular to the light incident surface being greater than a length of the second part measured in the direction perpendicular to the light incident surface, wherein the first light-blocking layer is made of colored dyes mixed with a resin, an optical adhesive, or a solvent, each of the first part and the second part of the first light-blocking layer has a thickness of smaller than 0.1 mm, and the first light-blocking layer satisfies the condition of $L1=L2+(T\times\cot\theta)$, where L1 denotes the length of the first part measured in the direction perpendicular to the light incident surface, L2 denotes the length of the second part measured in the direction perpendicular to the light incident surface, T denotes a length of the opposite surface measured in a direction perpendicular to the light exit surface, and $\theta$ denotes a panel inspection angle; and
a light source located on the light incident side of the light guide plate.

2. The backlight module as claimed in claim 1, wherein the first light-blocking layer further comprises a third part formed on the opposite surface, and two ends of the third part are respectively connected with the first part and the second part.

3. The backlight module as claimed in claim 1, wherein one end of the first part closest to the light incident surface is away from the opposite surface by a first distance, one end of the second part closest to the light incident surface is away from the opposite surface by a second distance, and the first distance is greater than the second distance.

4. The backlight module as claimed in claim 1, wherein the first light-blocking layer is a coating layer, a printed layer or a glue dispensing layer deposited on a surface of the light guide plate.

5. The backlight module as claimed in claim 1, further comprising a second light-blocking layer disposed on the light incident side.

6. The backlight module as claimed in claim 5, wherein the second light-blocking layer is a coating layer, a printed layer or a glue dispensing layer deposited on a surface of the light guide plate.

7. The backlight module as claimed in claim 5, wherein the second light-blocking layer has a thickness of smaller than 0.1 mm.

8. A backlight module, comprising:
a light guide plate having a light incident surface, an opposite surface opposite the light incident surface, a light exit surface connected between the light incident surface and the opposite surface, and a bottom surface opposite the light exit surface;
a light source disposed adjacent to the light incident surface; and
a surface deposition layer comprising a first part formed on the light exit surface, a second part formed on the bottom surface and a third part formed on the opposite surface, each of the first part, the second part and the third part of the surface deposition layer having a thickness of smaller than 0.1 mm, wherein the surface deposition layer comprises an opaque material or a low light-transmittance material, the surface deposition layer is made of colored dyes mixed with a resin, an optical adhesive, or a solvent, and the surface deposition layer satisfies the condition of $L1=L2+(T\times\cot\theta)$, where L1 denotes a length of the first part measured in a direction perpendicular to the light incident surface, L2 denotes a length of the second part measured in the direction perpendicular to the light incident surface, T denotes a length of the opposite surface measured in a direction perpendicular to the light exit surface, and $\theta$ denotes a panel inspection angle.

9. The backlight module as claimed in claim 8, wherein the surface deposition layer is further provided on a part of the light incident surface.

10. The backlight module as claimed in claim 8, wherein the surface deposition layer is a coating layer, a printed layer or a glue dispensing layer.

* * * * *